United States Patent
Holmes

(12) United States Patent (10) Patent No.: US 7,036,448 B1
Holmes (45) Date of Patent: May 2, 2006

(54) DOCK BUMPER

(76) Inventor: Joseph S. Holmes, 7301 Nob Hill Dr., Carmichael, CA (US) 95608

( * ) Notice: Subject to any disclaimer, the term of this patent is extended or adjusted under 35 U.S.C. 154(b) by 0 days.

(21) Appl. No.: 11/049,914

(22) Filed: Feb. 3, 2005

(51) Int. Cl.
*B63B 59/02* (2006.01)

(52) U.S. Cl. .................................................. 114/219

(58) Field of Classification Search ............... 441/108, 441/113; 114/219
See application file for complete search history.

(56) References Cited

U.S. PATENT DOCUMENTS

| | | | |
|---|---|---|---|
| 1,877,793 A | 9/1932 | Beynon | |
| 2,960,055 A | 11/1960 | Tomek | |
| 3,077,618 A * | 2/1963 | O'Link | 441/113 |
| 3,179,397 A | 4/1965 | Cleereman et al. | |
| 3,475,914 A | 11/1969 | Porter | |
| 3,540,403 A | 11/1970 | Russell | |
| 4,964,760 A | 10/1990 | Hartman | |
| 5,018,471 A * | 5/1991 | Stevens | 405/211 |
| D452,466 S | 12/2001 | Skulnick | |
| D473,508 S | 4/2003 | Mastrofilipo, Jr. | |
| 6,752,098 B1 | 6/2004 | Skulnick | |
| 6,758,156 B1 | 7/2004 | Kobas | |

* cited by examiner

*Primary Examiner*—Stephen Avila
(74) *Attorney, Agent, or Firm*—Thomas R. Lampe

(57) ABSTRACT

A marine bumper for releasable connection to dock structure includes an elongated bumper cushion of compression resistant foam material, an inner cover of water impermeable, plastic sheeting and an outer cover of woven plastic sheet material. Passageways extending through the elongated bumper cushion accommodate securement straps, the securement straps passing through openings in the inner and outer covers.

9 Claims, 2 Drawing Sheets

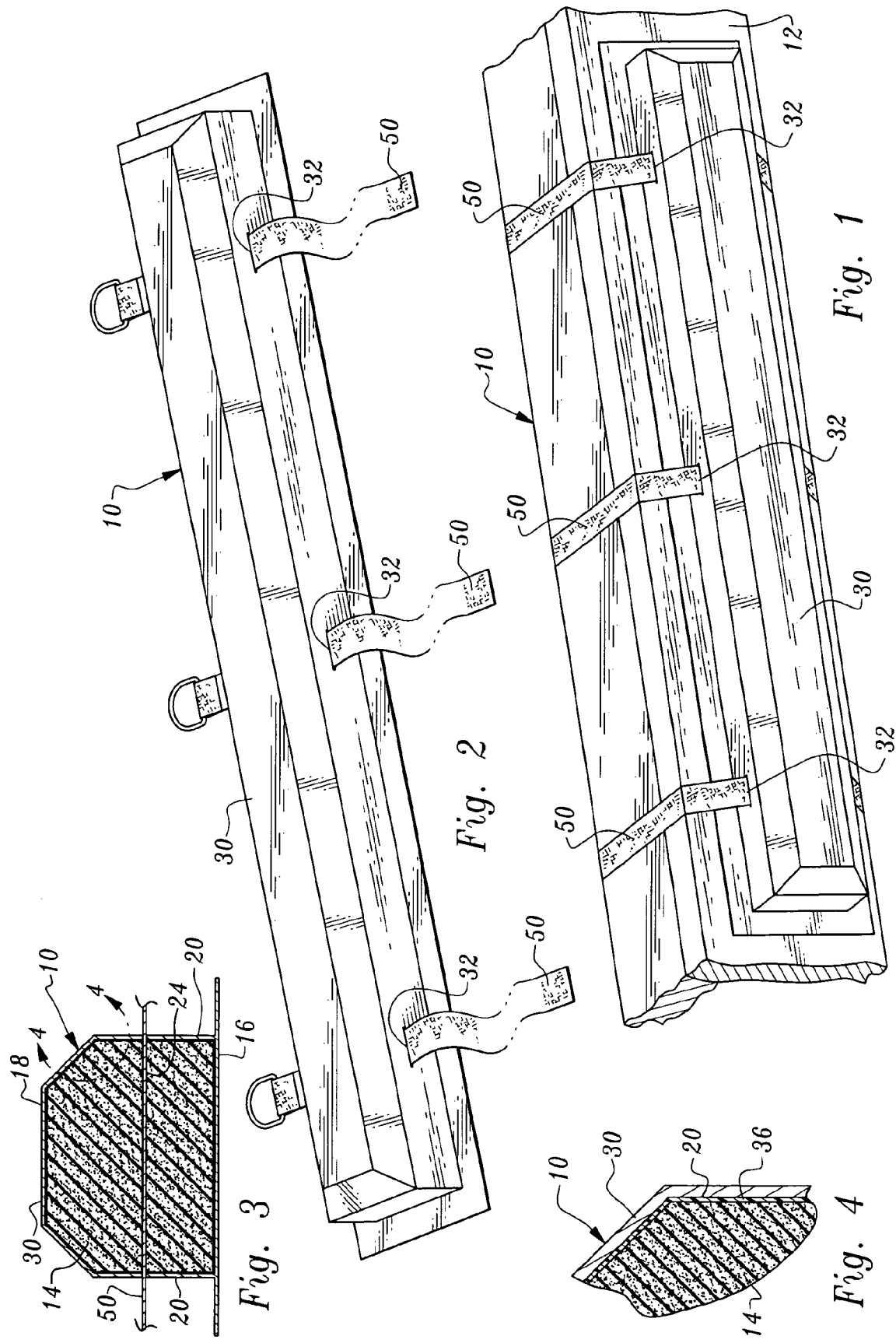

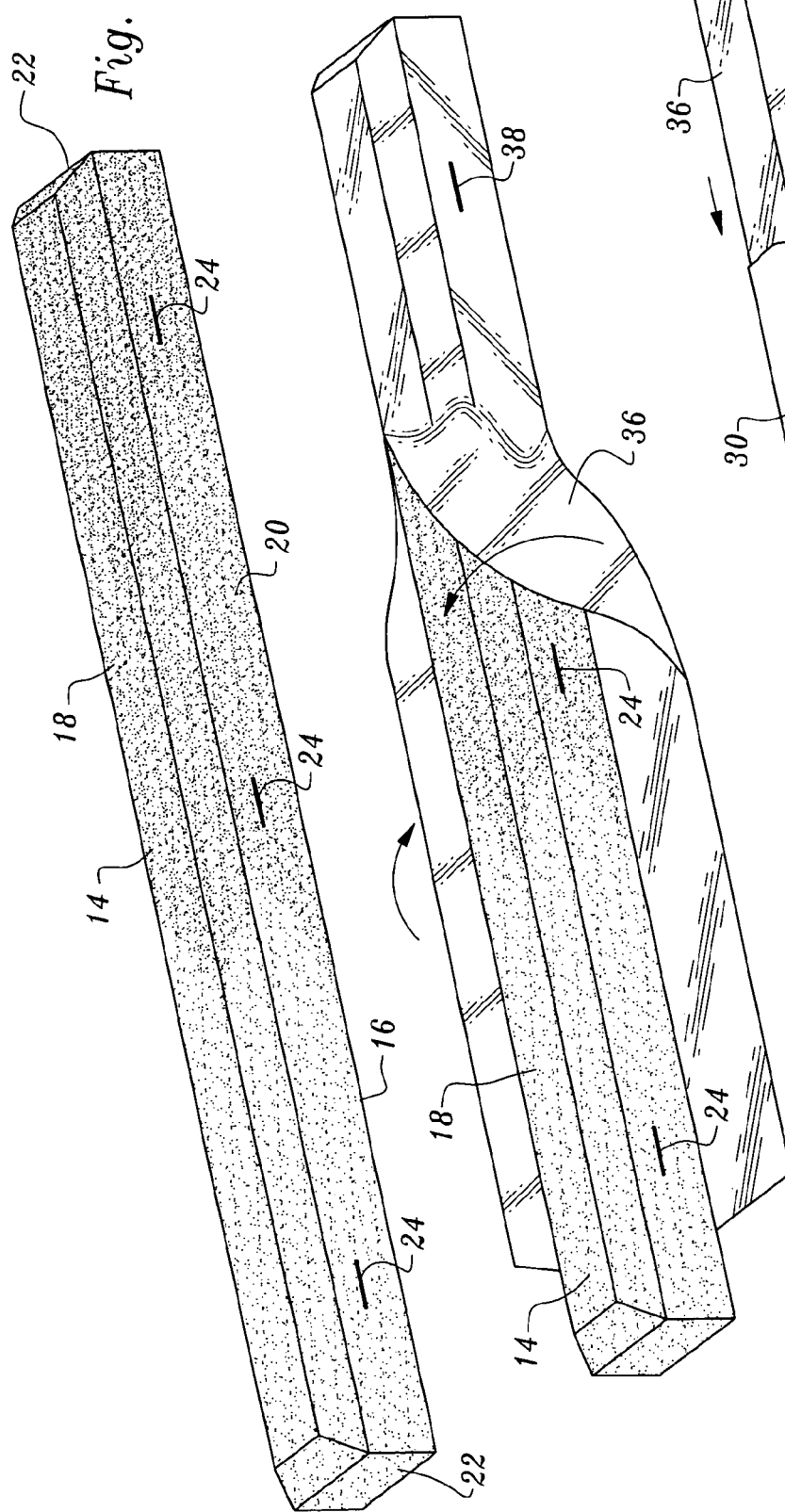
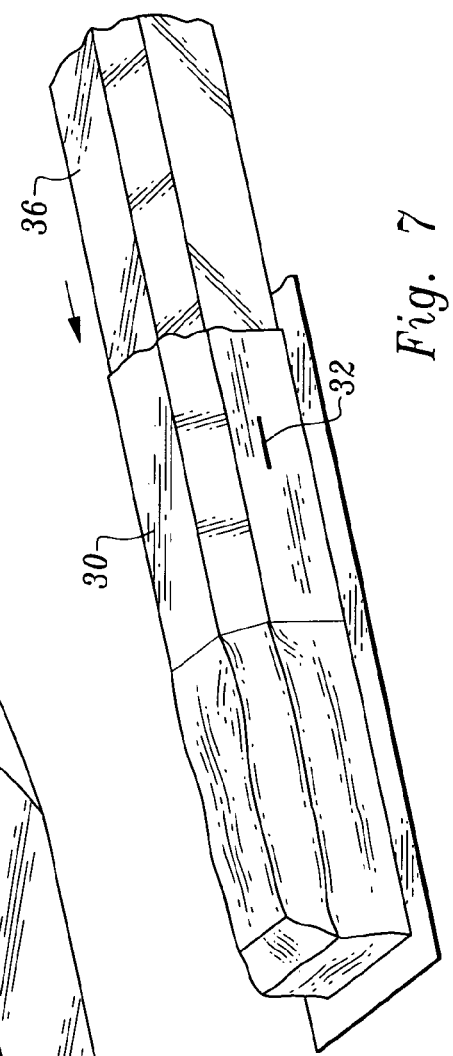

DOCK BUMPER

TECHNICAL FIELD

This invention relates to a marine bumper, and more particularly to a dock bumper for releasable connection to dock structure for preventing direct impact between the dock structure and a boat.

BACKGROUND OF THE INVENTION

Marine bumpers and fenders generally are well known devices for preventing direct contact between a floating boat and marine structures such as pilings, docks, etc.

In a dock installation, bumpers are conventionally constructed so as to be tacked or nailed in place at a desired location. Nailing of these devices causes damage to docks and some boat and yacht harbors ban installations of this type.

Straps have been utilized with bumpers or fenders secured to pilings, with the straps disposed between an inner plastic foam core and an outer sleeve. Such an arrangement is not effective to hold bumpers in place. Slippage can readily occur, allowing the bumpers to move out of position.

The following United States patents are believed to be representative of the current state of the prior art in this field: U.S. Pat. No. 5,018,471, issued May 28, 1991, U.S. Pat. No. 1,877,793, issued Sep. 20, 1932, U.S. Pat. No. 3,475,914, issued Nov. 4, 1969, U.S. Pat. No. 6,752,098, issued Jun. 22, 2004, U.S. Pat. No. 6,758,156, issued Jul. 6, 2004, U.S. Pat. No. 4,964,760, issued Oct. 23, 1990, U.S. Pat. No. 3,179,397, issued Apr. 20, 1965, U.S. Pat. No. 2,960,055, issued Nov. 15, 1960, U.S. Pat. No. 3,540,403, issued Nov. 17, 1970, U.S. Design Pat. No. D473,508, issued Apr. 22, 2003 and U.S. Design Pat. No. D452,466, issued Dec. 25, 2001.

U.S. Pat. No. 5,018,471 is of interest since it discloses a resilient marine fender secured to pilings of marine structures by straps which encircle the pilings. In one embodiment of the device of U.S. Pat. No. 5,018,471, a lengthwise portion of each strap of several strap assemblies is bonded within an associated bumper portion by molding the bumper portion about the strap. Such an approach makes it impossible to replace or interchange the strapping. This may be desirable, for example, when the strapping becomes worn or is of a size or length not appropriate for a particular application.

DISCLOSURE OF INVENTION

The present invention relates to a marine bumper which can be readily applied and utilized without damaging dock structure. Furthermore, the bumper is so constructed as to substantially prevent slippage between the bumper and the dock structure to which it is connected. In addition, the straps of the marine bumper can be easily replaced.

Another aspect of the invention resides in the ability of the marine bumper to wick water therefrom to promote drying of the bumper, adding to the longevity of the device. Also, no nails or other mechanical fasteners other than securement strap structure need be employed so that dock structure is not damaged. The marine bumper is easy to install and remove, as desired.

The marine bumper of the present invention is for releasable connection to dock structure for preventing direct impact between the dock structure and the boat.

The marine bumper includes an elongated bumper cushion formed of compression resistant plastic foam material having a cushion inner surface, a cushion outer surface opposed to the cushion inner surface, opposed cushion sides extending between the inner cushion surface and the outer surface and cushion end walls.

The bumper cushion defines spaced passageways extending completely between the opposed cushion sides and located between and spaced from the cushion inner surface and the cushion outer surface and located between the cushion end walls.

An outer cover envelopes the bumper cushion which is formed of plastic sheet material and defines cover openings in communication with passageways of the bumper cushion at both of the opposed cushion sides.

In the illustrated preferred embodiment of the invention, the marine bumper additionally includes an inner cover disposed between the outer cover and the bumper cushion, the inner cover enveloping the bumper cushion and formed of water impermeable plastic sheeting.

Securement straps extend completely through the passageways, sheet openings formed in the inner cover plastic sheeting and cover openings of the outer cover.

The elongated straps, when positioned in the passageways and connecting the marine bumper to dock structure with the cushion inner surface facing the dock structure, exerts opposed compressive forces on the bumper cushion between the elongated straps and the dock structure whereby relative movement between the marine bumper and the dock structure is substantially prevented due to frictional engagement therebetween.

Other features, advantages and objects of the present invention will become apparent with reference to the following description and accompanying drawings.

BRIEF DESCRIPTION OF DRAWINGS

FIG. 1 is a perspective view illustrating a marine bumper constructed in accordance with the teachings of the present invention connected to a side of a dock;

FIG. 2 is a perspective view of the marine bumper disconnected from the dock;

FIG. 3 is an enlarged, cross-sectional view taken along a line transverse to the longitudinal axis of the marine bumper;

FIG. 4 is a greatly enlarged, cross-sectional view of a portion of the marine bumper delineated by double headed arrow 4—4 in FIG. 3;

FIG. 5 is a perspective view of the elongated bumper cushion of the marine fender;

FIG. 6 is a perspective view illustrating the bumper cushion in the process of being enveloped by water impermeable, smooth surfaced plastic sheeting; and FIG. 7 illustrates a portion of the bumper cushion and inner cover of water impermeable, plastic sheeting being inserted into a sleeve or outer cover formed of woven polyester material.

BEST MODE FOR CARRYING OUT THE INVENTION

Referring now to the drawings, a marine bumper constructed in accordance with the teachings of the present invention is identified by reference numeral 10. FIG. 1 shows the marine bumper 10 in place on the side of a dock 12 of typical construction. FIGS. 2–4 show the fully assembled marine bumper disconnected from the dock.

The marine bumper includes an elongated bumper cushion 14 having a cushion inner surface 16, a cushion outer surface 18 opposed to the cushion inner surface, opposed cushion sides 20 extending between the inner cushion surface and the outer cushion surface and cushion end walls 22. The bumper cushion 14 is formed of high density expanded polyethylene foam. A density rating of about 2.2 is highly suitable for use in this environment.

The bumper cushion defines spaced, parallel passageways 24 extending completely between the opposed cushion sides 20 and located between and spaced from the cushion inner surface 16 and the cushion outer surface 18. The passageways are located between the cushion end walls and extend orthogonally relative to the main axis of the bumper cushion.

An outer cover 30 envelopes the bumper cushion. The outer cover 30 is formed of plastic sheet material and defines cover openings 32 in communication with the passageways of the bumper cushion at both of the opposed cushion sides 20. More particularly, the plastic sheet material forming the outer cover 30 is preferably woven polyester fabric, the woven structure defining the cover openings.

The marine bumper also includes an inner cover 36 disposed between the outer cover 30 and the bumper cushion. The inner cover envelopes the bumper cushion and is formed of water impermeable plastic sheeting which is solid other than sheet openings 38 which are defined thereby and are in communication with the cover openings 32 and passageways 24. The plastic sheeting of the inner cover has a smooth outer surface.

It has been found that the combination of a smooth outer surface for the plastic sheeting of the inner cover and the openings defined by the woven polyester material of the outer cover 30 promote wicking of moisture from between the inner cover and the outer cover so that drying of the marine bumper is promoted, adding to the longevity thereof.

Securement straps 50 formed of poly webbing or the like and having attachment buckles at ends thereof pass completely through the passageways 24 and the communicating cover openings and sheet openings. Securement strap end portions extend outside the outer cover for releasable connection to one another to connect the marine bumper to dock structure as shown in FIG. 1, for example.

The elongated straps when in position in the passageways and connecting the marine bumper to dock structure with the cushion inner surface facing the dock structure, exert opposed compressive forces on the bumper cushion between the elongated straps and the dock structure whereby relative movement between the marine bumper and the dock structure is substantially prevented due to frictional engagement therebetween. Because of the relatively dense nature of the plastic foam material, compression thereof is resisted and the elastic memory of the foam material serves to maintain a tight interconnection between the marine bumper and the dock.

FIG. 5 shows the bumper cushion 14. FIG. 6 shows the bumper cushion being wrapped, or enveloped, by the inner cover 36. Sheet openings 38 may be formed by slitting the inner cover after wrapping or may be preformed in the inner cover.

FIG. 7 shows the subassembly of bumper cushion and inner cover 36 wrapped thereabout being slid into place through an open end of a preformed sleeve comprising the outer cover 30. The smooth outer surface of the inner cover facilitates placement of the bumper cushion—inner cover subassembly into the sleeve. After the sleeve is occupied completely by the subassembly, the open end of the sleeve is sewn or otherwise secured in place. As was the case with regard to the inner cover openings, the outer cover openings 32 may be either preformed in the sleeve or formed after complete assembly so that the securement straps may be positioned as shown in FIG. 2, extending through passageways 24, and the inner and outer cover openings.

The invention claimed is:

1. A marine bumper for releasable connection to dock structure for preventing direct impact between the dock structure and a boat, said marine bumper comprising, in combination:

an elongated bumper cushion formed of compression resistant plastic foam material having a cushion inner surface, a cushion outer surface opposed to said cushion inner surface, opposed cushion sides extending between said inner cushion surface and said outer cushion surface, and cushion end walls, said bumper cushion defining spaced passageways extending completely between said opposed cushion sides and located between and spaced from said cushion inner surface and said cushion outer surface and located between said cushion end walls;

an outer cover enveloping said bumper cushion formed of plastic woven fabric and defining cover openings in communication with passageways of said bumper cushion at both of said opposed cushion sides;

securement straps extending completely through said passageways and the cover openings in communication with said passageways, said securement straps having securement strap end portions extending outside said outer cover for releasable connection to one another to connect said marine bumper to dock structure, said elongated straps being unbonded to said bumper cushion and selectively removable therefrom to allow ready replacement of said elongated straps, and said elongated straps, when in position in said passageways and connecting said marine bumper to dock structure with the cushion inner surface facing the dock structure, exerting opposed compressive forces on said bumper cushion between said elongated straps and the dock structure whereby relative movement between said marine bumper and the dock structure is substantially prevented due to frictional engagement therebetween; and an inner cover disposed between said outer cover and said bumper cushion, said inner cover enveloping said bumper cushion and formed of water impermeable, plastic sheeting.

2. The marine bumper according to claim 1 wherein said compression resistant plastic foam material is high density polyethylene foam.

3. The marine bumper according to claim 1 wherein said plastic woven fabric is woven polyester fabric.

4. The marine bumper according to claim 1 wherein said plastic sheeting defines sheet openings in communication with said cover openings and said passageways, said sheet openings accommodating said securement straps.

5. The marine bumper according to claim 4 wherein said plastic sheeting has a smooth outer surface and wherein said plastic woven fabric defines openings promoting wicking of moisture from between said inner cover and said outer cover.

6. The marine bumper according to claim 2 wherein said high density polyethylene foam has a density of about 2.2.

7. A marine bumper for releasable connection to dock structure for preventing direct impact between the dock structure and a boat, said marine bumper comprising, in combination:

an elongated bumper cushion formed of compression resistant plastic foam material having a cushion inner surface, a cushion outer surface opposed to said cushion inner surface, opposed cushion sides extending between said inner cushion surface and said outer cushion surface, and cushion end walls;

an outer cover enveloping said bumper cushion formed oven fabric;

securement structure to connect said marine bumper to dock structure; and an inner cover disposed between said outer cover and said bumper cushion, said inner cover enveloping said bumper cushion and formed of water impermeable, plastic sheeting.

8. The marine bumper according to claim 7 wherein said plastic woven fabric is woven polyester fabric.

9. The marine bumper according to claim 7 wherein said plastic sheeting has a smooth outer surface and wherein said plastic woven fabric defines openings promoting wicking of moisture from between said inner cover and said outer cover.

* * * * *